(12) United States Patent
Finkelstein et al.

(10) Patent No.: US 8,584,115 B2
(45) Date of Patent: Nov. 12, 2013

(54) AUTOMATED OPERATING SYSTEM DEVICE DRIVER UPDATING SYSTEM

(75) Inventors: Paul E. Finkelstein, Naperville, IL (US); Susan M. Guy, Concord, NC (US); Rajeev Puri, Charlotte, NC (US); Hsiao C. Thio, Palatine, IL (US); Nelson Velazquez, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 1483 days.

(21) Appl. No.: 11/539,050

(22) Filed: Oct. 5, 2006

(65) Prior Publication Data

US 2008/0098094 A1    Apr. 24, 2008

(51) Int. Cl.
*G06F 9/44* (2006.01)

(52) U.S. Cl.
USPC .............................. 717/173; 717/168; 717/171

(58) Field of Classification Search
None
See application file for complete search history.

(56) References Cited

U.S. PATENT DOCUMENTS

| | | | |
|---|---|---|---|
| 5,325,532 A | 6/1994 | Crosswy et al. | |
| 6,199,204 B1 * | 3/2001 | Donohue | 717/178 |
| 6,385,663 B2 | 5/2002 | Senator | |
| 6,493,871 B1 * | 12/2002 | McGuire et al. | 717/173 |
| 6,832,373 B2 * | 12/2004 | O'Neill | 717/171 |
| 6,986,133 B2 * | 1/2006 | O'Brien et al. | 717/173 |
| 7,020,875 B2 * | 3/2006 | Zweifel et al. | 717/168 |
| 7,036,129 B1 | 4/2006 | Korhonen | |
| 7,055,026 B2 | 5/2006 | Gere | |
| 7,146,412 B2 * | 12/2006 | Turnbull | 709/220 |
| 7,565,517 B1 * | 7/2009 | Arbon | 713/1 |
| 7,574,481 B2 * | 8/2009 | Moore et al. | 709/217 |
| 7,584,467 B2 * | 9/2009 | Wickham et al. | 717/171 |
| 7,913,246 B2 * | 3/2011 | Hammond et al. | 717/173 |
| 8,407,682 B2 * | 3/2013 | Reisman | 717/168 |
| 2003/0101290 A1 | 5/2003 | Lin et al. | |
| 2004/0003266 A1 * | 1/2004 | Moshir et al. | 713/191 |
| 2006/0026304 A1 * | 2/2006 | Price | 710/8 |

(Continued)

OTHER PUBLICATIONS

Baumann et el .Providing Dynamic Update in an Operating System, Proceedings of the 2005 USENIX Annual Technical Conference, Apr. 10-15, 2005, Retrieved on [Jun. 10, 2013] Retrieved from the Internet: URL<http://static.usenix.org/event/usenix05/tech/general/full_papers/baumann/baumann_html/>.*

(Continued)

*Primary Examiner* — Thuy Dao
*Assistant Examiner* — Cheneca Smith
(74) *Attorney, Agent, or Firm* — Mark Vallone, Esq.; Matthew M. Hulihan, Esq.; Heslin Rothenberg Farley & Mesiti P.C.

(57) ABSTRACT

Generally speaking, systems, methods and media for updating device drivers of an operating system for a server computer system are disclosed. Embodiments may include a method for updating device drivers for a server computer system by a build server. Embodiments of the method may include determining whether device drivers for an operating system image source need to be updated, such as by crawling a vendor website. Embodiments may also include in response to determining that device driver updates need to be downloaded, scheduling a time for download of device driver updates. Embodiments of the method may also include downloading the scheduled device driver updates based on the scheduled time and storing the device driver updates in a device driver update database. Further embodiments of the method may include installing the operating system image source on a target server and installing the device driver updates on the target server.

27 Claims, 5 Drawing Sheets

(56) References Cited

U.S. PATENT DOCUMENTS

| | | |
|---|---|---|
| 2006/0070089 A1 | 3/2006 | Shoaib et al. |
| 2006/0200814 A1* | 9/2006 | Kontinen et al. ............. 717/168 |
| 2006/0235886 A1* | 10/2006 | Norman .................... 707/104.1 |
| 2007/0157192 A1* | 7/2007 | Hoefler et al. ................ 717/168 |
| 2007/0180445 A1* | 8/2007 | Greeff .......................... 717/174 |
| 2007/0240149 A1* | 10/2007 | Cromer et al. ............... 717/171 |

OTHER PUBLICATIONS

Chen et al.Live Updating Operating Systems Using Virtualization, Proceedings of the 2nd international conference on Virtual execution environments, Jun. 2006, Retrieved on [Jun. 10, 2013] Retrieved from the Internet: URL<http://dl.acm.org/citation.cfm?id=1134767>.*

* cited by examiner

AUTOMATED OPERATING SYSTEM DEVICE DRIVER UPDATING SYSTEM

FIELD OF INVENTION

The present invention is in the field of data processing systems and, in particular, to systems, methods and media for updating device drivers of an operating system for a server computer system.

BACKGROUND

Computer systems are well known in the art and have attained widespread use for providing computer power to many segments of today's modern society. Computer systems such as personal computers (PCs) and servers may typically include a system unit having a central processing unit (CPU) and associated volatile and non-volatile memory, including random access memory (RAM) and basic input/output system read only memory (BIOS ROM), a system monitor, a CD-ROM or DVD-ROM drive, a fixed disk storage drive (also known as a "hard drive"), user input devices, and a network interface adapter. One of the distinguishing characteristics of these systems is the use of a motherboard or system planar to electrically connect these components together. Computers systems typically include software such as computer programs in addition to the hardware. As advances in semiconductor processing and computer architecture continue to push the performance of computer hardware higher, more sophisticated computer software has evolved to take advantage of the higher performance of the hardware, resulting in computer systems that continue to increase in complexity and power.

Computer systems have thus evolved into extremely sophisticated devices that may be found in many different settings. Many organizations utilize server computer systems for more complicated tasks such as providing e-commerce websites, providing complex multi-user applications, maintaining large databases, or performing other resource-intensive tasks. Organizations with significant computing needs often have many servers performing a wide variety of tasks with the servers communicating with each other via a network such as a local area network (LAN). To help maintain and configure these computer systems, system administrators may utilize a build server to maintain an operating system (OS) image source that can be used to help install the operating system on newly acquired servers or other servers that require operating system installation (such as servers where an OS reinstall occurs to help correct operational problems). Installation of a new operating system from an OS image source is often automated so that the operating system is copied from the build server to the new, target server over the network.

One problem with the automated installation process is that the newly installed operating system will often not boot if the incorrect device drivers are included within the operating system as copied from the OS image source. If the incorrect device drivers are included with the operating system when the server is first booted, an OS image crash may occur that results in an inability to use the server until the problem is fixed. This can often occur when an OS image source has the device drivers for a particular server model and the target server is a newer model that requires updated device drivers. To many customers, the OS image crash is an unacceptable situation since the server will have to be rebuilt and their server availability will be delayed. Depending on the applications that the customer intends to run on the server, this could result in huge losses in profits. The failure of the rebuilt server to boot also requires diagnosis of the problem (incorrect device drivers) and manual download and installation of the correct drivers, requiring wasted manpower in addition to server downtime. While the correct device drivers can be downloaded to restore functionality of the server, the problems resulting from outdated device drivers waste valuable resources and can cause customer dissatisfaction.

SUMMARY OF THE INVENTION

The problems identified above are in large part addressed by systems, methods and media for updating device drivers of an operating system for a server computer system. Embodiments may include a method for updating device drivers for a server computer system by a build server. Embodiments of the method may include determining whether device drivers for an operating system image source need to be updated and, in response to determining that device driver updates need to be downloaded, scheduling a time for download of device driver updates. Embodiments of the method may also include downloading the scheduled device driver updates based on the scheduled time and storing the device driver updates in a device driver update database. Further embodiments of the method may include installing the operating system image source on a target server and installing the device driver updates on the target server. Installing the device driver updates may include copying the device driver updates to the target server after installing the operating system image source or copying the device driver updates to the operating system image source before installing the operating system image source on the target server. The method may also include setting a configuration parameter based on received input from a user, where the configuration parameter may include a wait time before crawling a vendor website, an indication of device drivers to be excluded, or a time for downloading device drivers. Determining whether device drivers for the operating system image source need to be updated may include crawling a vendor website for device driver updates, such as by crawling after waiting a specified time since a last crawl of the vendor website. The method may include, after crawling the vendor website, comparing a list of found device driver updates with a list of current device drivers. Embodiments of the method may further include where scheduling the download of device driver updates includes excluding one or more device driver updates from download based on an exclusion filter.

Another embodiment provides a computer-readable medium containing instructions effective, when executing in a data processing system, to cause the system to perform a series of operations for updating device drivers for a server computer system. The series of operations generally includes a series of operations for updating device drivers for a server computer system by a build server. Embodiments may also include a series of operations for determining whether device drivers for an operating system image source need to be updated and, in response to determining that device driver updates need to be downloaded, scheduling a time for download of device driver updates. Embodiments may also include a series of operations for downloading the scheduled device driver updates based on the scheduled time and storing the device driver updates in a device driver update database. Further embodiments may include a series of operations for installing the operating system image source on a target server and installing the device driver updates on the target server.

A further embodiment provides a device driver update system including a build server in communication with a target server via a network. The build server may include a database having an operating system image source for installing an operating system on a target server, where the operating system image source includes one or more operating system device drivers. The build server may also include an operating system installer to install the operating system image source on the target server via the network. The build server may also include a device driver updater to download and install the device driver updates. The device driver updater may include a device driver update detector to determine whether device driver updates need to be downloaded and a device driver update downloader to schedule a download of device driver updates to be downloaded and to download the device driver updates. The device driver updater may further include a device driver update installer to install the downloaded device driver updates on the target server via the network.

BRIEF DESCRIPTION OF THE DRAWINGS

Aspects of certain embodiments of the invention will become apparent upon reading the following detailed description and upon reference to the accompanying drawings in which, like references may indicate similar elements.

DETAILED DESCRIPTION OF EMBODIMENTS

Figure 1:
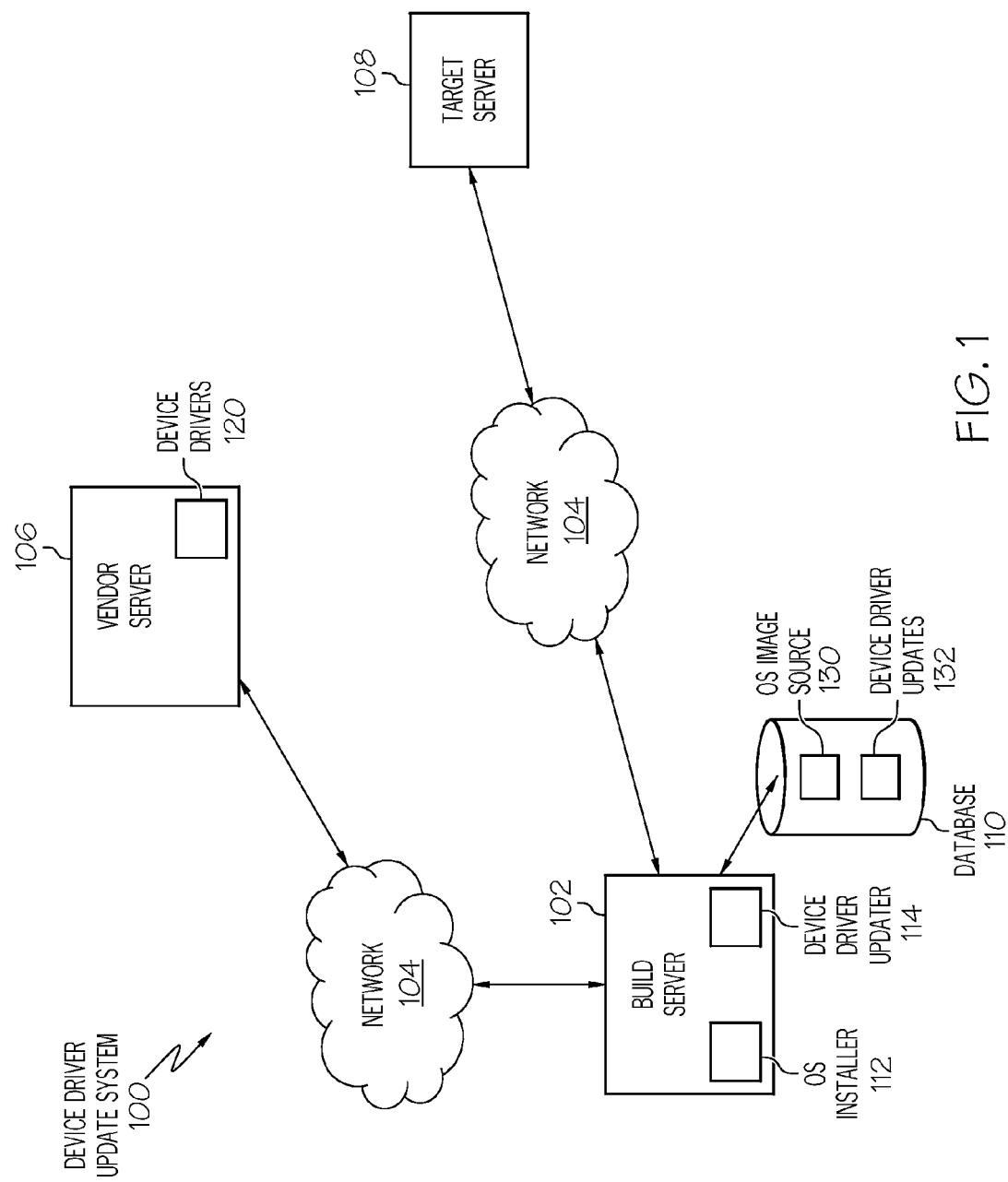
FIG. 1 depicts an environment for a device driver update system with a build server with a device driver updater as well as a target server according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for updating device drivers of an operating system for a server computer system are disclosed. Embodiments may include a method for updating device drivers for a server computer system by a build server. Embodiments of the method may include determining whether device drivers for an operating system image source need to be updated, such as by crawling a vendor website. Embodiments may also include in response to determining that device driver updates need to be downloaded, scheduling a time for download of device driver updates. Embodiments of the method may also include downloading the scheduled device driver updates based on the scheduled time and storing the device driver updates in a device driver update database. Further embodiments of the method may include installing the operating system image source on a target server and installing the device driver updates on the target server.

The system and methodology of the disclosed embodiments allows for effective and efficient updates of device drivers for servers that are provided operating systems by copying of an operating system image source. The disclosed methodology provides for automatically downloading device driver updates for a stored OS image source so that, upon the need to install the OS on a new server, updated device drivers may also be installed. This may help prevent failure of the new server upon reboot as outdated device drivers are one of the most common causes of error for OS installs, potentially resulting in avoidance of significant downtime of servers. The disclosed methodology may, in some embodiments, automatically download new device drivers that it finds by crawling a vendor website and may also advantageously schedule such downloads for convenient times. The disclosed methodology may also in some embodiments provide for performing the crawling of one or more vendor websites on a particular schedule, such as by waiting a specified time between successive searches. The disclosed methodology may also eliminate the need for administrators to perform time-consuming manual downloads of updated device drivers as well as the potential for error associated with such tasks.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware and/or software systems. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts an environment for a device driver update system with a build server with a device driver updater as well as a target server according to some embodiments. In the depicted embodiment, the device driver update system 100 includes a build server 102 having a database 110 in communication with a target server 108 via a network 104. The build server 102 may also be in communication with one or more vendor servers 106 via network 104 so that the build server 102 may find and download device driver updates from the vendor servers 106. As will be described in more detail subsequently, the disclosed device driver update system 100 may provide for installation of OS image sources with updated device drivers from the build server 102 to a target server 108 by facilitating automatic download of device driver updates from a vendor server 106.

In the device driver update system 100, the components may be located at the same location, such as in the same building or computer lab, or could be remote. While the term "remote" is used with reference to the distance between the components of the device driver update system 100, the term is used in the sense of indicating separation of some sort, rather than in the sense of indicating a large physical distance between the systems. For example, any of the components of the device driver update system 100 may be physically adjacent or located as part of the same computer system in some network arrangements. In some embodiments, for example, the build server 102 and target servers 108 may be located within the same facility, while in other embodiments they may be geographically distant (though connected via network 104).

The build server 102 may be a server computer system or other computer system adapted to execute computer programs. In some embodiments, the build server 102 may be one or more server computer systems such as an International Business Machine Corporation (IBM) xSeries® server, an IBM pSeries® server, an IBM eServer® server, an IBM WebSphere® application server, or other computer system (such as described in relation to FIG. 2). Build server 102 may include an OS installer 112 and a device driver updater 114 as well as database 110. OS installer 112 may be a build server technology that automates installation of an OS on a target server 108, such as IBM's Director/Remote Deployment Manager (RDM) and Network Installation Manager (NIM) build server technologies. An OS installer 112 may define, configure, and store an OS image source that contains the appropriate device drivers for the target server 108 model. The OS installer 112 may utilize a stored OS image source to install the OS from the build server 102 to a target server 108 using network 104.

Aspects of the invention described herein may be stored or distributed on a computer-readable medium as well as distributed electronically over the Internet or over other networks, including wireless networks. A computer-readable medium may encompass a computer readable storage medium, such as a computer-readable storage device, or a computer-readable propagation medium. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable storage medium can be any apparatus that can store the program for use by or in connection with the instruction execution system, apparatus, or device. The medium may be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The term "computer-readable storage medium" does not encompass a computer-readable propagation medium, such as a copper cable, optical fiber, or wireless transmission media.

Network 104 may be any type of data communications channel or combination of channels, such as the Internet, an intranet, a LAN, a WAN, an Ethernet network, a wireless network, telephone network, a proprietary network, or a broadband cable network. Network 104 may serve as a communication medium between components of the device driver update system 100. In one example, the Internet or other public network may be particularly useful as a network 104 between the build server 102 and a vendor server 106, while a LAN may be particularly useful to facilitate communication between a build server 102 and target server 108 located within the same organization. Those skilled in the art will recognize, however, that the invention described herein may be implemented utilizing any type or combination of data communications channel(s) without departure from the scope and spirit of the invention.

The vendor server 106 may be any computer system adapted to provide device drivers 120 via a network 104. In some embodiments, the vendor server 106 may be a Web server that hosts a website having one or more download pages that contain various operating system device drivers 120. A server manufacturer or OS provider, for example, may have a website that allows its users to download the latest version of the device drivers 120 for update of their systems.

Figure 2:
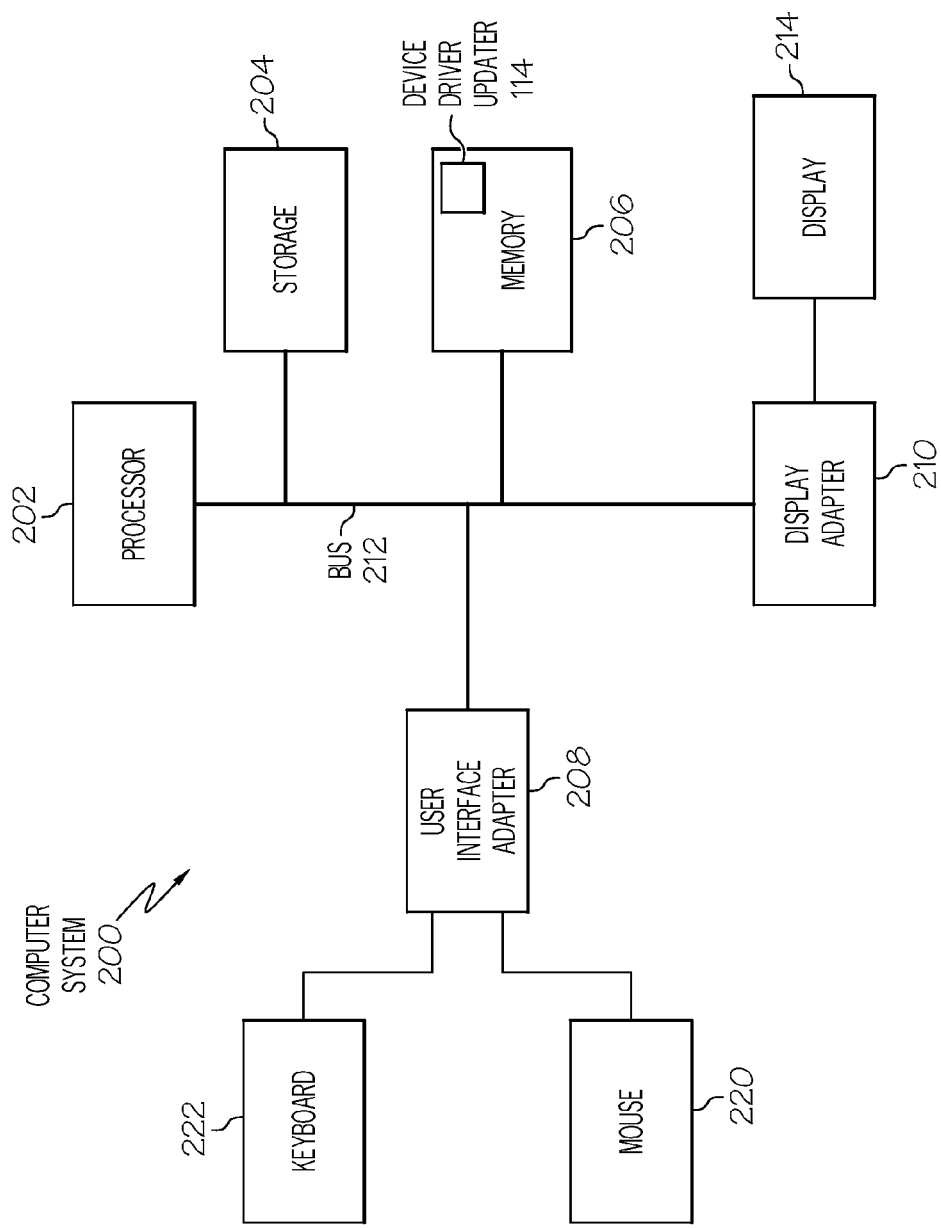
FIG. 2 depicts a block diagram of one embodiment of a computer system suitable for use as a component of the device driver update system, such as a build server or target server.

Similarly to the build server 102, the target server 108 may be implemented on a server computer such as an International Business Machine Corporation (IBM) xSeries® server, an IBM pSeries® server, an IBM eServer® server, an IBM Websphere® application server, or other computer system (such as described in relation to FIG. 2). Target servers 108 may include any type of servers, such as database servers, Web servers, application servers, and other types of servers. As described previously, a build server 102 and its components may install an operating system on the target server 108 based on an OS image source and any device driver updates.

Database 110 may include one or more OS image sources 130 as well as device driver updates 132 associated with one or more OS image sources 130. A database 110 may include multiple OS image sources 130, for example, each also potentially having device driver updates 132. In some embodiments, the device driver updates 132 may be stored as a series of files within a directory associated with a particular OS image source 130 and may actually be stored within the OS image source 130. In these embodiments, a current list of device drivers may be created when an OS image source 130 is initially save. As described herein, when device driver updates are downloaded they may be added to the device driver updates 132 stored in database 110 for use during OS image source 130 installation. In some embodiments, database 110 may be wholly or partially integrated within a build server 102 while in other embodiments, database 110 may be separate from the build server 102, such as when a single database 110 servers multiple build servers 102. Those skilled in the art will recognize that database 110 may be implemented utilizing any type or combination of storage devices without departure from the scope and spirit of the invention.

The systems and methodologies of the disclosed embodiments provide an efficient and effective mechanism for updating a target server 108 with an OS image source 130 with updated OS device drivers. By automatically detecting new device drivers from an OS vendor and downloading the new device drivers, the updated OS image source 130 may be installed over network 104 on a target server 108 in an unattended fashion. The disclosed system may help prevent OS failure when new models of target servers 108 are utilized that required newer device drivers than are stored in the appropriate OS image source 130. The disclosed system may in some embodiments separate the device drivers from an OS image source 130 so that only the device drivers need be updated (or include the device driver updates 132 within the OS image source 130 but in a particular location), eliminating the need to modify the much larger OS image source 130 file.

FIG. 2 depicts a block diagram of one embodiment of a computer system 200 suitable for use as a component of the device driver update system 100, such as a build server 102 or target server 108. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the device driver updater 114 of the build server 102, such as managing device driver updates for an OS image source 130, and may temporarily or permanently store information during its calculations or results after calculations in storage 204 or memory 206. All of part of the device driver updater 114, for example, may be stored in memory 206 during execution of its routines.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. An administrator of a build server 102 setting the configurations for search for or downloading updated device drivers, for example, may utilize the keyboard 222 and mouse 220 to interact with the device driver updater 114. The bus 212 may also connect the processor 202 to a display, such as an LCD display or CRT monitor, via the display adapter 210.

Figure 3:
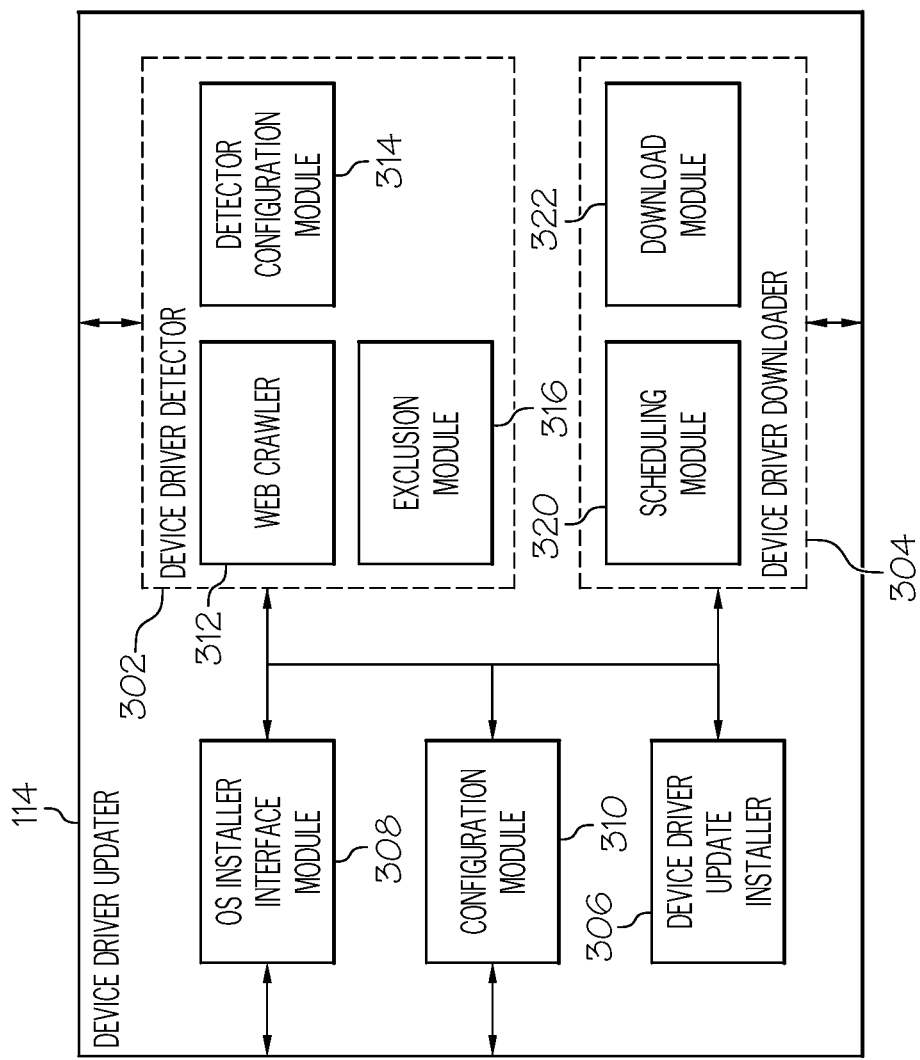
FIG. 3 depicts a conceptual illustration of software components of a device driver updater according to some embodiments.

FIG. 3 depicts a conceptual illustration of software components of a device driver updater 114 according to some embodiments. As described previously (and in more detail in relation to FIGS. 4-5), the device driver updater 114 may automatically determine when the device drivers of an OS image source need updated, may automatically schedule a download of the updates, may automatically download and store the updates, and may assist in installing the updated device drivers. The device driver updater 114 may execute on a build server 102 and may optionally be wholly or partially integrated within an OS installer 112. The device driver updater 114 may include a device driver detector 302, a device driver downloader 304, a device driver update installer 306, an OS installer interface module 308, and a configuration module 310.

The device driver detector 302 may determine whether updated device drivers are available and should be downloaded for a particular OS image source 130. The operation of the device driver detector 302 and its components is described in more detail in relation to FIG. 5. The device driver detector 302 may include a web crawler 312, a detector configuration module 314, and an exclusion module 316. The web crawler 312 may search a designated website of a vendor (hosted by a vendor server 106) to find potential updates of device drivers that are relevant to a particular OS image source 130. The web crawler 312 may search all or part of a website in order to find links associated with downloadable device drivers. In some embodiments, the web crawler 312 may "remember" where it has already search so as to minimize duplicative searching. The web crawler 312 may also, in some embodiments, search for device driver links by searching for keywords associated with device drivers. The web crawler 312 may compare found device drivers with a list of current device drivers to determine whether device driver updates should be downloaded. In some embodiments, an administrator may specify the time and frequency of the web crawler's 312 searching for network management purposes.

The detector configuration module 314 of the device driver detector 302 (possibly in conjunction with the configuration module 310) may receive user preferences as to the operation of the device driver detector 302. An administrator, for example, may specify a time for the web crawler 312 to wait in between crawls of a vendor website. In another example, an administrator may specify particular vendor websites for the web crawler 312 to crawl or other websites to avoid. The exclusion module 316 may receive information from a user as to particular device drivers to not download and may use this information to generate an exclusion list. For example, an administrator may specify that printer device driver updates need not be downloaded for a particular OS image source 130 as the customer does not utilize printers for the target servers 108. The exclusion module 316 may add the printer device drivers to an exclusion list, and the device driver detector 302 may utilize the exclusion list to prevent printer device drivers from being downloaded, saving network and storage resources.

The device driver downloader 304 may, based on device driver update indications received from the device driver detector 302, schedule and perform a download of the device driver updates. The device driver downloader 304 may include a scheduling module 320 to schedule downloads of device driver updates. The device driver downloader 304 may receive an indication of user preferences as to a time and day for downloading device driver updates by communication with the configuration module 310. In some embodiments, an administrator or other user may desire to have downloads performed overnight or other timeframe when network usage is relatively low. In other embodiments, the scheduling module 320 may determine a time of download based on other factors, such as default download times, known network downtime, etc. The device driver downloader 304 may also have a download module 322 to perform the actual downloads of device driver updates and to store the results in database 110. The device driver downloader 304 may perform its download at a time specified by the scheduling module 320.

The device driver update installer 306 may install the updated device drivers, possibly in conjunction with the OS installer 112. In some embodiments, the device driver update installer 306 may install the updated device drivers by copying the updated drivers to the device driver updates 132 stored with the OS image source 130 in database 110. The device driver update installer 306 may copy the files before installation of the OS image source 130 by the OS installer 112 so that the OS installer 112 installs the latest device drivers. In other embodiments, the device driver update installer 306 may copy the updated device drivers to the appropriate location on the target server 108 after the OS image source 130 has been installed but before booting of the target server 108, so that the target server 108 receives the updated device drivers before its first boot.

The OS installer interface module 308 may provide an interface between the OS installer 112 and components of the device driver updater 114 as necessary. For example, the OS installer 112 may transmit a request to update the device drivers to the device driver update installer 306 via the OS installer interface module 308. The configuration module 310 may facilitate receiving user input as to desired configuration settings and may also determine configuration parameters in absence of user preference (or overriding such preference, if necessary). The configuration module 310 may provide output to a user via display, e-mail, printout, or other means, and may receive input via any user input devices. Configuration parameters may include a wait time before crawling a vendor website, an indication of device drivers to be excluded, a time for downloading device drivers, or other information.

Figure 4:
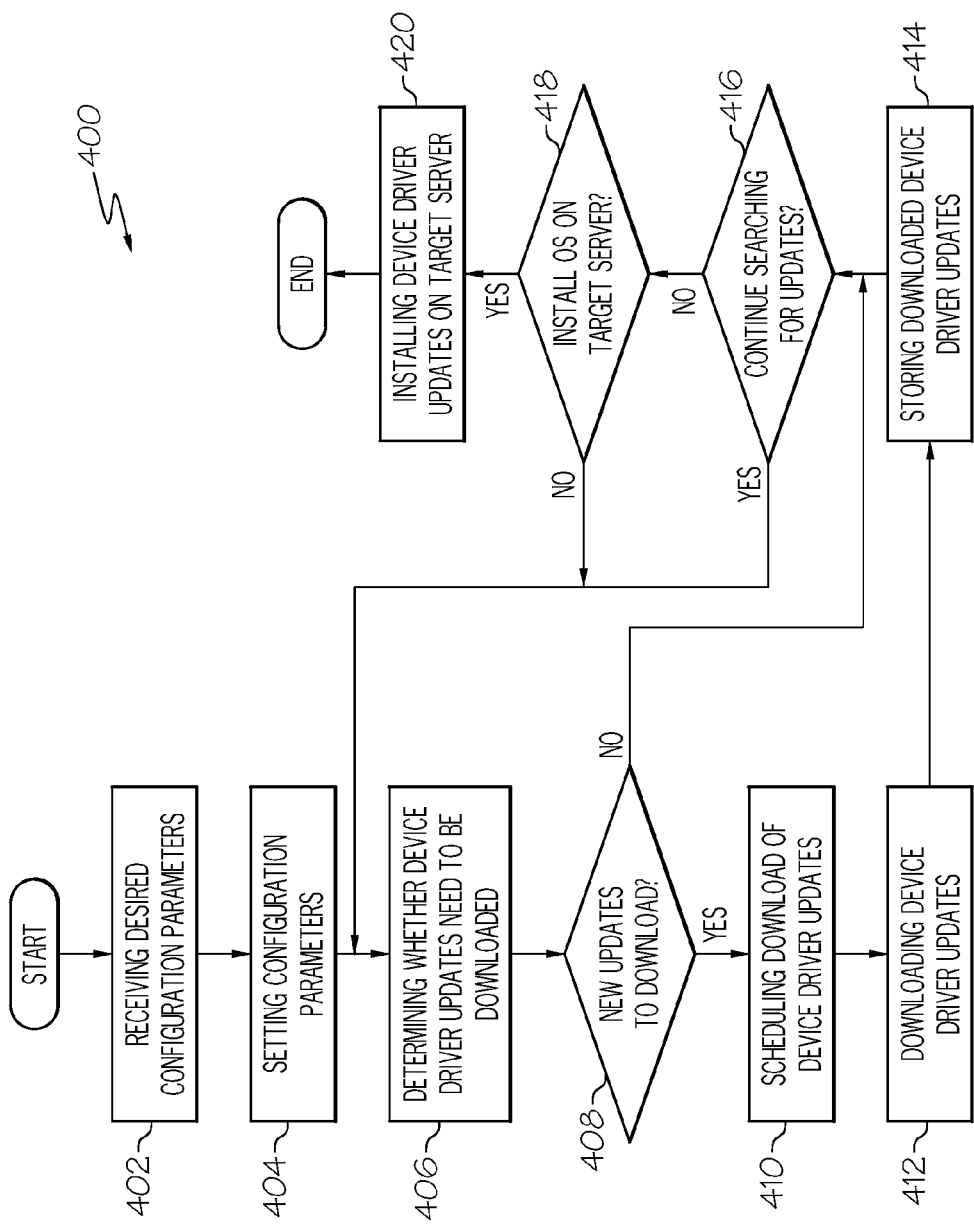
FIG. 4 depicts an example of a flow chart for determining that device driver updates are required and scheduling, downloading, and installing the updates according to some embodiments.

FIG. 4 depicts an example of a flow chart 400 for determining that device driver updates are required and scheduling, downloading, and installing the updates according to some embodiments. The method of flow chart 400 may be performed, in one embodiment, by components of a device driver updater 114. Flow chart 400 begins with element 402, where the configuration module 310 may receive desired configuration parameters from a user. The configuration module 310 may set the configuration parameters at element 404 based on any received user input as well as other factors, such as network outages or the preferences of higher authority level users. The configuration module 310 may also communicate any update detector-related parameters to the detector configuration module 314.

At element 406, the device driver detector 302 may begin determining whether device driver updates need to be downloaded for a particular OS image source 130. As will be described in more detail in relation to FIG. 5, the device driver detector 302 may crawl a vendor website searching for new device drivers and may compare its results to a list of current device drivers in order to make its determination. Alternatively, the device driver detector 302 may search for updates at specified locations and eliminate the need to crawl a website, but such a solution requires maintenance of the download links and limits the ability to change the vendor website. If, at decision block 408, the device driver detector 302 determined that there were no new updates to download, the method of flow chart 400 continues to decision block 416 for continued operation. If, at decision block 408, the device driver detector 302 determined that there were updates to download, the method of flow chart 400 continues to element 410, where the scheduling module 320 of the device driver downloader 304 may schedule download of device driver updates. As described previously, the scheduled time may be based on configuration parameters relating to desired download time. Once the scheduled time arrives, the download module 322 may download the device driver updates at element 412 and may store the downloaded device driver updates 132 in database 110.

Once downloading of updates has been completed, the device driver updater 114 may determine at decision block 416 whether to continue searching for updates. If the device driver updater 114 determines to continue searching, the method of flow chart 400 may return to element 406 for renewed searching. In some embodiments, the device driver updater 114 may delay continuing to search for a specified wait time, such as based on a configuration parameter. An administrator may, for example, specify that the determination and web crawling occur only once an hour, a day, a week, or any other period. If the administrator sets a wait time of one day, the determination of element 406 will thus only occur once a day, reducing the amount of network resources required for the crawling. An administrator will likely balance the benefit of the "freshest" updates with the computational and network resources required for continued searching for updates.

At decision block 418, the device driver updater 114 may determine whether an OS image source 130 is being installed on a target server 108, such as by receiving a communication of the event from an OS installer 112. If installation is occurring, the device driver update installer 306 may install the device driver updates on the target server 108 at element 420, after which the method terminates. As described previously, the device driver update installer 306 may perform element 420 in conjunction with the OS installer 112 by either modifying the updated device drivers 132 before copying of the OS image source 130 or by copying the updated device drivers after the OS image source has been recreated at the target server 108.

Figure 5:
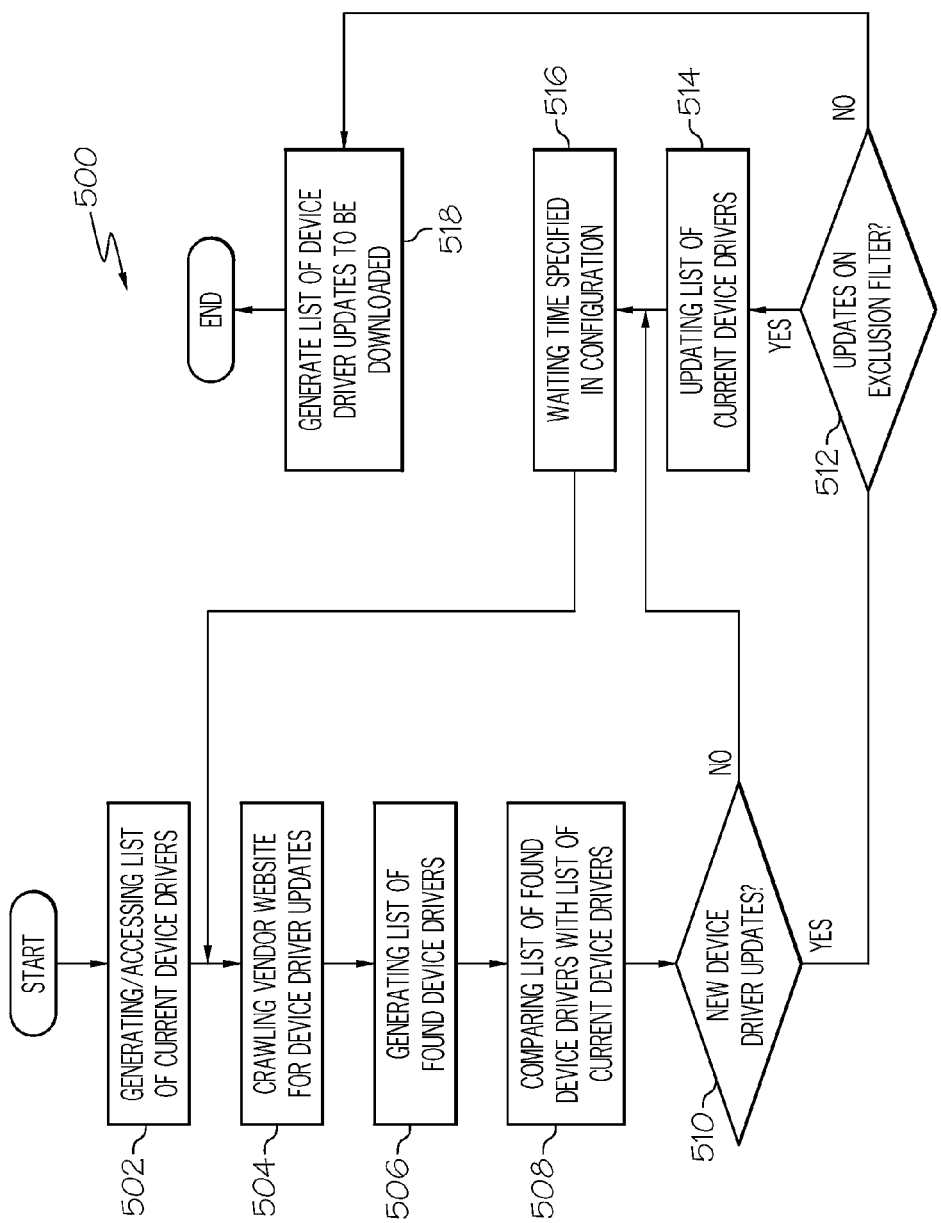
FIG. 5 depicts an example of a flow chart for determining that device driver updates need to be downloaded according to some embodiments.

FIG. 5 depicts an example of a flow chart 500 for determining that device driver updates need to be downloaded according to some embodiments. The method of flow chart 500 may be performed, in one embodiment, by components of a device driver updater 114 such as the device driver detector 302. The method of flow chart 500 corresponds to one methodology to perform the functionality of element 406 of flow chart 400 of FIG. 4, and other methodologies are also possible. Flow chart 500 begins with element 502, where the device driver detector 302 may generate and/or access a list of current device drivers associated with an OS image source 130. In some embodiments, when an OS image source 130 is first created, a set of device drivers is also included in the image source, such as in a separate directory structure. This list of device drivers may serve as the initial snapshot of device drivers utilized by flow chart 500.

At element 504, the web crawler 312 may begin crawling one or more vendor websites searching for device drivers to update. Web crawling is generally known in the art and any web crawling methodology known or later developed may be utilized at element 504. In some embodiments as implemented with IBM's AIX operating system, the web crawler 312 may check a top-level vendor website recursively for the latest drivers based upon keywords inputted into a database (e.g., driver, technology, level, etc.). As the pages are being traversed, the database may be continuously referenced to see if the driver already exists in the database. If a new driver is found, the information and future search keywords regarding the technology level found are gathered and catalogued in the database and the associated filesets are identified for download.

Once the web crawling at element 504 is complete, the web crawler 312 may generate a list of found device drivers at element 506. The device driver detector 302 may then at element 508 compare the list of found device drivers with the list of the current device drivers from element 502 by parsing the two lists. If the device driver detector 302 determines at decision block 510 that the found device drivers does not include any updates to the current list of device drivers (i.e., the found device drivers are the same as the current ones and the lists are the same), the method of flow chart 500 continues to decision block 516. If the device driver detector 302 determines at decision block 510 that the found device drivers includes updates to the current list of device drivers (i.e., the lists are different), the method of flow chart 500 continues to decision block 512.

At decision block 512, the detector configuration module 314 may determine whether any of the updates are on the exclusion filter of device drivers the user does not want to be downloaded in order to eliminate unnecessary network traffic and storage space on the build server 102. If no device drivers are indicated on the exclusion filter, the method of flow chart 500 continues to element 518, where the device driver detector 302 generates a list of device driver updates to be downloaded, after which the method terminates. The generated list may be used in flow chart 400 for scheduling and downloading the device driver updates. If a found device driver is on the exclusion list at decision block 512, the device driver detector 302 may update the list of current device drivers at element 514 to reflect the updated, but excluded, device driver. The method may then continue to element 516, where the method may wait a period specified as a configuration parameter before returning to element 504 for renewed web crawling of a vendor website.

It will be apparent to those skilled in the art having the benefit of this disclosure that the present invention contemplates methods, systems, and media for updating device drivers of a server. It is understood that the form of the invention shown and described in the detailed description and the drawings are to be taken merely as examples. It is intended that the following claims be interpreted broadly to embrace all the variations of the example embodiments disclosed.

What is claimed is:

1. A method for updating device drivers for a computer system, the method comprising the steps of:
   a build server creating a list of current device drivers for an operating system image;
   the build server searching a pre-determined website for device driver updates for the operating system image using one or more stored keywords;
   the build server, responsive to finding a plurality of device driver updates for the operating system image, comparing the plurality of device driver updates with an exclusion filter, wherein the exclusion filter comprises an exclusion list indicating at least one device driver update of the plurality of device driver updates that is not to be scheduled for download;
   the build server, responsive to determining that a first device driver update of the plurality of device driver updates matches indicated by the exclusion list as not to be scheduled for download, updating the list of current device drivers for the operating system image to indicate the first device driver update on the list of current device drivers for the operating system image;
   the build server, responsive to determining that a second device driver update of the plurality of device driver updates is not indicated by the exclusion list, scheduling a time for downloading the second device driver update;
   the build server downloading the second device driver update at the scheduled time; and
   the build server storing the second device driver update in a database.

2. The method of claim 1, further comprising the steps of:
   the build server installing the operating system image on a target computer system; and
   the build server installing the second device driver update on the target computer system.

3. The method of claim 2, wherein the step of the build server installing the second device driver update on the target computer system comprises the step of the build server copying the second device driver update to the target computer system after the step of the build server installing the operating system image on the target computer system.

4. The method of claim 2, wherein the step of the build server installing the second device driver update on the target computer system comprises the step of the build server copying the second device driver update to the operating system image before the step of the build server installing the operating system image on the target computer system.

5. The method of claim 1, further comprising the step of the build server setting a configuration parameter based on received input from a user.

6. The method of claim 5, wherein the configuration parameter comprises a wait time before searching the pre-determined website, an indication of device drivers to be excluded from downloading, or a time for downloading device drivers.

7. The method of claim 1, wherein the one or more stored keywords identify one or more of: a driver, a technology, and a level.

8. The method of claim 1, further comprising the step of the build server, responsive to finding the plurality of device driver updates for the operating system image, comparing a list of found device driver updates with the list of device drivers for the operating system image.

9. The method of claim 1, wherein the step of the build server searching the pre-determined website for device driver updates comprises the step of the build server searching the pre-determined website after waiting a specified time since a last search of the pre-determined website.

10. The method of claim 1, further comprising the step of the build server, responsive to finding the plurality of device driver updates for the operating system image, storing one or more new keywords in a database.

11. The method of claim 1, wherein the operating system image includes a set of device drivers stored in a separate directory structure.

12. A computer program product for updating device drivers for a computer system, the computer program product comprising:
one or more computer-readable, tangible storage devices;
program instructions, stored on at least one of the one or more storage devices, to create a list of current device drivers for an operating system image;
program instructions, stored on at least one of the one or more storage devices, to search a pre-determined website for device driver updates for the operating system image using one or more stored keywords;
program instructions, stored on at least one of the one or more storage devices, to compare, responsive to finding a plurality of device driver updates for the operating system image, the plurality of device driver updates with an exclusion filter, wherein the exclusion filter comprises an exclusion list indicating at least one device driver update of the plurality of device driver updates that is not to be scheduled for download;
program instructions, stored on at least one of the one or more storage devices, to update, responsive to determining that a first device driver update of the plurality of device driver updates is indicated by the exclusion list as not to be scheduled for download, the list of current device drivers for the operating system image to indicate the first device driver update on the list of current device drivers for the operating system image;
program instructions, stored on at least one of the one or more storage devices, to schedule, responsive to determining that a second device driver update of the plurality of device driver updates is not indicated by the exclusion list, a time for downloading the second device driver update;
program instructions, stored on at least one of the one or more storage devices, to download the second device driver update at the scheduled time; and
program instructions, stored on at least one of the one or more storage devices, to store the second device driver update in a device driver update database.

13. The computer program product of claim 12, further comprising:
program instructions, stored on at least one of the one or more storage devices, to install the operating system image on a target computer system; and
program instructions, stored on at least one of the one or more storage devices, to install the second device driver update on the target computer system.

14. The computer program product of claim 12, further comprising program instructions, stored on at least one of the one or more storage devices, to set a configuration parameter based on received input from a user.

15. The computer program product of claim 12, wherein the one or more stored keywords identify one or more of: a driver, a technology, and a level.

16. The computer program product of claim 12, further comprising program instructions, stored on at least one of the one or more storage devices, to compare a list of found device driver updates with the list of device drivers for the operating system image responsive to finding the plurality of device driver updates for the operating system image.

17. The computer program product of claim 12, wherein the program instructions to search the pre-determined website for device driver updates comprise program instructions to search the pre-determined website for device driver updates after waiting a specified time since a last search of the pre-determined website.

18. The computer program product of claim 12, further comprising program instructions, stored on at least one of the one or more storage devices, to store one or more new keywords in a database responsive to finding the plurality of device driver updates for the operating system image.

19. The computer program product of claim 12, wherein the operating system image includes a set of device drivers stored in a separate directory structure.

20. A computer system for updating device drivers for a target computer system, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to create a list of current device drivers for an operating system image;
program instructions, stored on at least one of the one or more storage devices for execution by at least one of the one or more processors via at least one of the one or more memories, to search a pre-determined website for device driver updates for the operating system image using one or more stored keywords;
program instructions, stored on at least one of the one or more storage devices for execution by at least one of the one or more processors via at least one of the one or more memories, to compare, responsive to finding a plurality of device driver updates for the operating system image, the plurality of device driver updates with an exclusion filter, wherein the exclusion filter comprises an exclusion list indicating at least one device driver update of the plurality of device driver updates that is not to be scheduled for download;
program instructions, stored on at least one of the one or more storage devices for execution by at least one of the one or more processors via at least one of the one or more memories, to update, responsive to determining that a first device driver update of the plurality of device driver updates is indicated by the exclusion list as not to be scheduled for download, the list of current device drivers for the operating system image to indicate the first device driver update on the list of current device drivers for the operating system image;

program instructions, stored on at least one of the one or more storage devices for execution by at least one of the one or more processors via at least one of the one or more memories, to schedule, responsive to determining that a second device driver update of the plurality of device driver updates is not indicated by the exclusion list, a time for downloading the second device driver update;

program instructions, stored on at least one of the one or more storage devices for execution by at least one of the one or more processors via at least one of the one or more memories, to download the second device driver update at the scheduled time; and program instructions, stored on at least one of the one or more storage devices for execution by at least one of the one or more processors via at least one of the one or more memories, to store the second device driver update in a database.

21. The computer system of claim 20, further comprising:

program instructions, stored on at least one of the one or more storage devices for execution by at least one of the one or more processors via at least one of the one or more memories, to install the operating system image on the target computer system; and program instructions, stored on at least one of the one or more storage devices for execution by at least one of the one or more processors via at least one of the one or more memories, to install the second device driver update on the target computer system.

22. The computer system of claim 20, further comprising program instructions, stored on at least one of the one or more storage devices for execution by at least one of the one or more processors via at least one of the one or more memories, to set a configuration parameter based on received input from a user.

23. The computer system of claim 20, wherein the one or more stored keywords identify one or more of: a driver, a technology, and a level.

24. The computer system of claim 20, further comprising program instructions, stored on at least one of the one or more storage devices for execution by at least one of the one or more processors via at least one of the one or more memories, to compare a list of found device driver updates with the list of device drivers for the operating system image responsive to finding the plurality of device driver updates for the operating system image.

25. The computer system of claim 20, wherein the program instructions to search the pre-determined website for device driver updates comprise program instructions to search the pre-determined website for device driver updates after waiting a specified time since a last search of the pre-determined website.

26. The computer system of claim 20, further comprising program instructions, stored on at least one of the one or more storage devices for execution by at least one of the one or more processors via at least one of the one or more memories, to store one or more new keywords in a database responsive to finding the plurality of device driver updates for the operating system image.

27. The computer system of claim 20, wherein the operating system image includes a set of device drivers stored in a separate directory structure.

\* \* \* \* \*